United States Patent [19]

Hapach et al.

[11] Patent Number: 5,298,164
[45] Date of Patent: Mar. 29, 1994

[54] EMISSION REDUCTION OF ORGANIC VOLATILES FROM AEROBIC BIOLOGICAL REACTORS

[75] Inventors: Gary S. Hapach, Valencia; Stanley R. Karrs, Gibsonia; Kenneth E. Ondrusek, Freedom, all of Pa.

[73] Assignee: United States Filter Corporation, Rancho Mirage, Calif.

[21] Appl. No.: 920,781

[22] Filed: Jul. 28, 1992

[51] Int. Cl.$^5$ .............................................. C02F 3/06
[52] U.S. Cl. .................................... 210/604; 210/614; 210/615; 210/618
[58] Field of Search ............... 210/604, 614, 615, 616, 210/617, 618, 621

[56] References Cited

U.S. PATENT DOCUMENTS

| | | | |
|---|---|---|---|
| 2,073,441 | 3/1937 | Blunk | 210/617 |
| 2,308,866 | 7/1943 | Dekema | 210/617 |
| 3,054,602 | 9/1962 | Proudman | 261/21 |
| 3,547,811 | 7/1969 | McWhirter | 210/604 |
| 4,009,098 | 2/1977 | Jeris | 210/604 |
| 4,069,147 | 1/1978 | Abrams et al. | 210/604 |
| 4,269,714 | 5/1981 | Ishikawa et al. | 210/627 |
| 4,482,458 | 11/1984 | Rovel et al. | 210/603 |
| 4,486,310 | 12/1984 | Thornton | 210/604 |
| 4,818,404 | 4/1989 | McDowell | 210/603 |
| 4,925,552 | 5/1990 | Bateson et al. | 210/617 |
| 4,975,194 | 12/1990 | Fuchs et al. | 210/604 |
| 5,080,793 | 1/1992 | Urlings | 210/615 |

FOREIGN PATENT DOCUMENTS 2824446 12/1979 Fed. Rep. of Germany.

*Primary Examiner*—Christopher Upton
*Attorney, Agent, or Firm*—Armstrong, Westerman, Hattori, McLeland & Naughton

[57] ABSTRACT

An aerobic treatment of waste water is accomplished in such a manner as to effectively reduce the emission of volatile organic compounds contained therein by first re-introducing oxygen containing gas previously used in the process as supplemented with additional oxygen containing gas to fulfill make-up requirements during the operation. The reuse is effected in an enclosed vessel having a lower sparging compartment within which both a suitable quantity of mixed reused and make-up gas is thoroughly mixed with contaminated waste water being introduced therein for treatment. The thus humidified gas and preliminarily treated waste water are then moved upwardly within and through a central biological growth area, and the treated waste water is formed as a liquid level in an upper compartment and removed through a trap therefrom to maintain a water level therein and collect the resultant treated oxygen containing gas above the water level. A portion of the oxygen containing gas containing volatiles therein may be vented and the main portion that is released above the water level is continuously removed from a chamber area above the water level, and progressively mixed with a suitable quantity of make-up oxygen containing gas, and then introduced into the sparging chamber for continuing the operation.

15 Claims, 2 Drawing Sheets

EMISSION REDUCTION OF ORGANIC VOLATILES FROM AEROBIC BIOLOGICAL REACTORS

This invention pertains to a procedure and apparatus for improving the aerobic treatment of waste water in a biological reactor system and particularly, to effecting a substantial biological growth in the sparging area of a reactor. It deals with materially decreasing the content of volatile contaminating gases in waste water that is being treated by a controlled pretreatment and utilization of a preliminary yield of such gases and a portion of oxygen gas being introduced and particularly, of an oxygen-containing gas such as air.

BACKGROUND OF THE INVENTION

The discharge of waste water containing biodegradable organic compounds into the environment can be a problem due to the deleterious effect of such compounds on naturally occurring biota in the environment or the degrading of the quality of the receiving body of water for other useful purposes. The deterioration of water quality may be due to either the oxygen depleting cycle caused by biodegradable compounds or the toxic effects of these compounds or a combination of both. For these reasons, regulatory requirements often limit the quantity or types of organic compounds that may be released into the environment in such wastewater discharges.

Biological treatment processes have been used to treat wastewaters containing organic materials to decrease or eliminate the deleterious effect of the wastewater discharge into the environment. Many types of biological treatment processes have been developed to address the problems. Biological treatment processes usually involve an engineering approach to a naturally occurring biological process. The engineering approach results in improvements to the natural process by reducing the size of equipment required, improving the level of treatment of the contaminants, reducing the energy requirements of the process, etc.

Aerobic processes utilize microorganisms that exist and flourish in the presence of oxygen. Organic material and inorganic nutrients are utilized in a life cycle that involves the oxidation of organic material to provide an energy source for the microorganisms. The ultimate product of the carbonaceous organic material in the aerobic processes is carbon dioxide. Aerobic processes can be further broken down into two major subcategories: suspended growth and fixed film. Fixed film systems utilize microorganisms that become attached or fixed to surfaces in the treatment system. Fixed film aerobic processes include surfaces that are submerged in the wastewater, exposed to the atmosphere with wastewater trickled over the surfaces, or a combination of the two. Processes that utilize submerged surfaces require a means for mixing or agitating the wastewater. Often air agitation is used, and may be effected by introducing a quantity of air in excess of that needed to satisfy the biological process, using a sparger arrangement to cause uniform agitation of the contents of the biological treatment reactor. A common feature of an aerobic process is the provision of means for introducing oxygen to the process for the purpose of sustaining the respiratory requirements of the beneficial microorganisms. Inherent in these processes is the requirement to vent unused oxygen as well as inert gases and products of biological respiration. An heretofore inherent disadvantage of aerobic processing is the tendency to transfer or strip volatile organic compounds from the liquid in the treatment reactor to the exhaust gas stream. This results in the discharge of objectionable amounts of volatile organic compounds into the environment via the exhaust gas from the reactor.

Various methods of treating the exhaust gas have been proposed or utilized to capture or destroy volatile organics in the exhaust gas stream. A common approach is the use of an activated carbon absorbent. Our approach has been to make use of a mixed gas having an oxygen to inert gas content, such as an approximate oxygen to nitrogen or carbon dioxide ratio by volume of about plus or minus 10% that is introduced at about or above normal room temperature for agitating volatile organic compounds and providing them with sufficient oxygen to biologically react with and supply microorganisms for stripping the volatile organics from contaminated waste water.

OBJECTS OF THE INVENTION

It is an object of our invention to reduce the emission of volatile organic compounds in the exhaust gas stream from an aerobic biological reactor system.

Another object is to develop a new approach to the use of an oxygen containing gas employed in a biological reactor.

A further object is to provide an apparatus and procedure for enhancing the biological treatment efficiency of an aerobic treatment of wastewater.

A still further object is to devise a refluxing system for reducing the emission atmospheric emission availability of volatile organic compounds contained in wastewater.

These and other objects will appear to those skilled in the art from the illustrated embodiments, the specification and the claims.

SUMMARY OF THE INVENTION

In carrying out our invention, we have discovered that the emission of volatile organic compounds, such as benzene, toluene, xylene and methyl ethyl ketone (MEK), can be materially lessened in a closed system employing an aerobic treatment of wastewater, wherein a replenishing oxygen-containing gas stream, such as air, is mixed with preused or preprocessed gas throughput from an upper area of a closed processing vessel or container. The mixed oxygen-containing gas is introduced or sparged into a bottom area of a closed vessel or container, and is flowed upwardly in a mixing-agitating relation through the vessel's contents to scour the contents of excessive biological growth and provide oxygen for biological treatment of the wastewater therein. Using this procedure, substantial biological growth was observed to occur below the packing material or circuitous flow-through reaction area and adjacent the upper portion of the sparger area. It is believed that this growth is promoted by the presence or the return presence of volatile organic compounds being sparged into the reactor since it was found to be absent in their absence. This makes possible an efficient, inexpensive and continuous type of operation, but highly importantly, enables a greatly reduced emission of volatile organics into the atmosphere as taken-off or vented from an upper portion of the vessel from which the preused gas is also taken or cycled.

Such pre-used gas is mixed with the oxygen containing gas, such as air, to make up for the content of the processed gas discharged from the upper portion of the reactor and then returned to a bottom sparging area of the vessel for upward flow movement through its biological reaction packing or processing area to an uppermost separating-out and discharge area or zone. We have thus discovered that the continuous reuse of a portion of the processed oxygen-containing gas stream with its mixed content of volatile organics previously stripped or released from a prior waste water throughput represents a key factor in attaining the improved results of our invention. In this connection, the amount of oxygen-containing gas reused should predetermine the amount to be added, such as air, to make up for the amount lost from the preceding throughput or cycle of operation.

This invention deals with the use of a previously processed or cycled oxygen-containing gas, such as air, with its through-put received content of stripped volatiles on what may be termed, a major percentage basis of gas input into the biological reactor, to supplement the oxygen gas being introduced into the sparging chamber or area of the reactor.

Means is provided for, in effect, reprocessing air as the oxygen containing gas and collecting it from a biological reactor to reintroduce at least a portion of such previously processed and treated oxygen containing gas into the process. The gas throughput contains some unconsumed oxygen, importantly some volatile organic contaminants, has retained heat and is humidified, and an inert gas such as nitrogen that contributes to agitation and provides a scouring effect in the reactor. Such gas as humidified and pretreated is then mixed with an oxygen to inert gas mixture before it is re-introduced into the reactor. This has been found to satisfy the oxygen needs of the microbial population of the biological reactor as well as in effecting agitation of its contents and a scouring of excess biological growth from the subject material or means. A relatively small portion of such gas may be exhausted from the reactor system with refluxed broken down volatiles to allow for introduction of make up air and to exhaust any excess inert gases such as nitrogen, carbon dioxide, etc.

There are numerous advantages to the handling of exhaust gas from the biological reactor in this manner.

The quantity of volatile organic compounds that become vaporized from the wastewater is substantially reduced. This maximizes the quantity of such compounds that are degraded to inert gas in the refluxing biological treatment process as opposed to becoming merely stripped from the wastewater and exhausted from the system.

The quantity of contaminating gas that is exhausted from the system is substantially reduced. This reduces the size of any subsequent step that may be required to remove volatile organic compounds from the exhaust gas prior to discharge into the environment.

Also, because the previously cycled gas is substantially humidified due to its prior intimate contact with the wastewater, its reuse will result in less evaporation in the biological reactor. Lower net evaporation in the biological reactor will result in lower heat loss from evaporative cooling. This results in an increased temperature of the contents of the biological reactor and generally improved treatment. This effect is especially important for operation in cold climates.

DETAILED DESCRIPTION OF THE ILLUSTRATED EMBODIMENTS OF OUR INVENTION

Our investigations have determined that the exhaust gas from a biological reactor contains oxygen that has not been consumed by its through-put in the reactor. Also, we found that where the wastewater processed in a biological reactor contains a volatile organic compound, the exhaust gas also contains an amount of the volatile organic compound that has been stripped from the wastewater that picks up humidity and heat.

For the purpose of definition as it relates to the invention, a "volatile organic compound" is considered to be any compound that is easily vaporized from an aqueous mixture by the introduction of and contacting with air. Examples of undesirable common volatile organic compounds include, but are not limited to; benzene, toluene, hexane, octane, trichloroethane, methyl ethyl ketone (MEK), etc. Gasoline and diesel fuel are examples of commercial mixtures that contain significant quantities of volatile organic compounds.

We have found that in a system, such as we contemplate and disclose, that utilizes air for agitation as well as for satisfying the respiratory needs of the microorganisms, that the loss-utilization of oxygen from the air fed into the system is approximately 8 to 10%. As such, we determined that the exhaust is suitable for further use within the system to provide agitation as well as to provide oxygen to the microorganisms.

Figure 1:
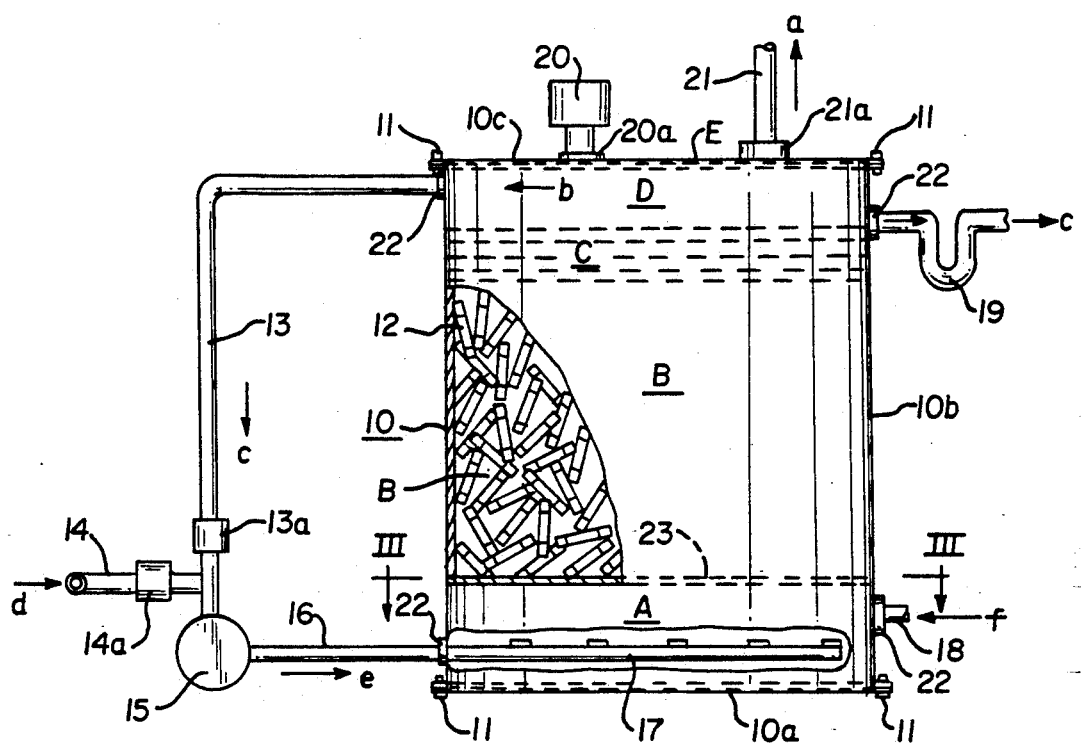
FIG. 1 is a somewhat diagrammatic view in elevation of an apparatus constructed and utilized in accordance with our invention wherein, bio tower random dump packing, such as of plastic or resin circular elements, is shown in the central or main processing chamber of the device.
Figure 4:
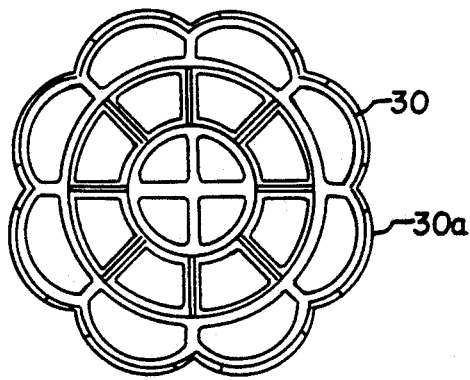
FIG. 4 is a slightly enlarged plan view and FIG. 5 is a vertical view in elevation on the same scale as FIG. 4 and showing a highly efficient form of bio tower packing element or rounded form of resin construction that may be employed as a random dump in effecting maximized biological growth of organic compounds being treated in the device.
Figure 5:
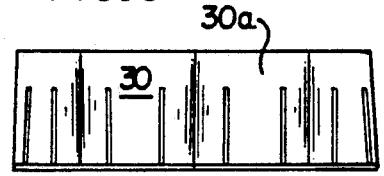

Referring to FIG. 1, a processing system showing an application of our invention embodies an aerobic biological reactor container or vessel 10 provided with a bottom closure plate 10a and a top closure plate or lid 10c that are removably secured in a sealed-off relation by bolt and nut assembles 11 to a circular upright side wall 10b. If desired, a man-way (not shown) may be provided for facilitating clean-out of the processing chambers, replacement of elements packing material, etc. Random packing 12, such as plastic rings 30, shown in FIGS. 1 4 and 5, may be randomly arranged by dumping them into the biotower vessel. They become coated with a film of microorganisms during operation of the unit or system. As shown, the rings 30 are supported by a cross-extending grid 23 that is positioned to extend across the inside of the side wall 10b between a sparging chamber A and an intermediate chamber B.

Waste water to be processed is introduced through inlet pipe 18 that is mounted on the wall 10b by a flange 22 for delivery into lower end of a sparging and premixing lower chamber area A. And, as particularly shown in FIG. 1, 2 and 3, an oxygen containing gas feed-in mixture is introduced into the area A through inlet piping 16 or 16' to a sparging pipe array 17. The piping 16 is shown in FIG. 1 as having a flange 22 mounting it on the wall 10b. The array 17 may have one or more legs (not shown) for it on the floor or base plate 10a of the vessel or container.

The entering contaminated wastewater, after being fully mixed with the oxygen containing gas and reacted and fully treated within an intermediate chamber B, passes upwardly, therefrom to provide a liquid level C in an upper enclosed chamber or compartment D of the container from which fully treated waste water may be withdrawn through gas trap 19 to thus maintain a constant liquid level in the upper portion of the container. Trap 19 also prevents escape of volatiles from an uppermost compartment or gas collecting chamber D of the container or vessel 10. A substantially constant pressure is maintained in the chamber D by a pressure relief safety valve or device 20 that is mounted by connection 20a on top closure wall or lid member 10c. Excess gas is vented through vent pipe 21 (see arrow b) to allow for fresh oxygen containing gas to be added to the system. This excess gas before the refluxing contains low levels of volatile organic compounds. The pipe 21 is also mounted at 21a to extend from the top wall or lid member 10c. In the upper chamber D, processed oxygen-containing gas or air (arrow b), flows through side outlet connection 22 and moves along piping 13, as shown in FIG. 1 and, as controlled by dampers 13a and 14a, mixes with atmospheric air in branch line 14. Blower 15 controls the flow of air supply d as introduced into line 16 to the sparging chamber or system A. Air blower 15 blends a return flow of preprocessed air from line 13 with a proper amount of newly entering atmospheric or other oxygen-containing gas, as controlled by damper 14a, to replace the amount lost due to precycling in the reaction vessel 10 and vented through vent pipe 21 (see arrow a).

Figure 2:
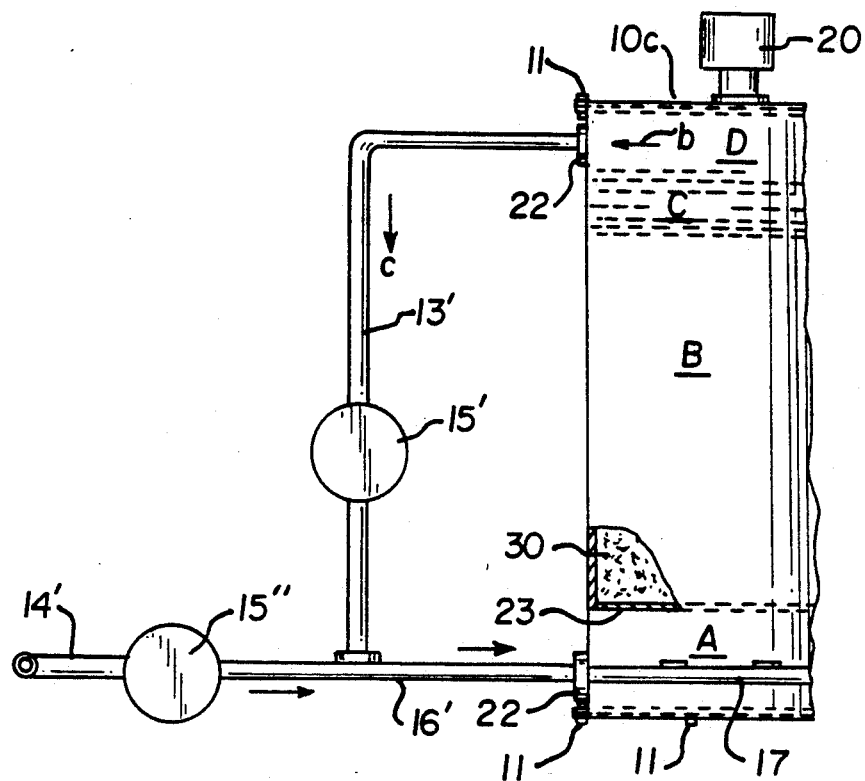
FIG. 2 is a similar but broken away view on the same scale and of a modified operational embodiment of our invention.
Figure 3:
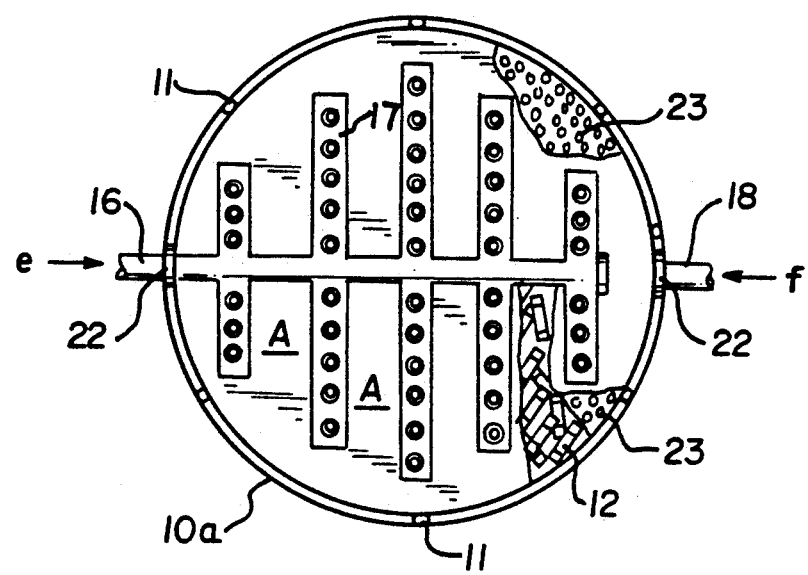
FIG. 3 is a horizontal section taken along the line III—III of FIG. 1.

FIG. 2 shows a slightly modified circuit for introducing the oxygen containing gas mixture through piping 16' into the sparging chamber A of the control reactor 10. In this layout or operating arrangement, preprocessed or conditioned oxygen-containing gas from return piping 13' is moved by blower 15' directly into the inlet pipe 16'. A properly proportioned amount of atmospheric air is supplied through line 14' and blower 15" and inlet pipe 16' to sparging array or unit 17 in a lower, enclosed sparging chamber A. In the arrangement of FIG. 2, the quantity of recycled to fresh air is shown controlled by two discreet blowers 15' and 15". This embodiment also makes practical a separate introduction of the fresh make-up air and of the pretreated or previously cycled and conditioned oxygen containing gas. In FIG. 3, the arrow e shows the inflow of gas to the sparging unit 17 and the arrow f shows the inflow of the waste water that is being treated.

In the course of the gas recycling, the concentration of the volatile organics increases in the gas stream. This follows, since the effect of recycling the gas allows for longer net contact time of a given volume of gas with the wastewater in the reactor. The concentration of organics could become as high as the saturation level based on the relative concentrations in the gas phase and aqueous phase. If saturation is reached or approached closely, then the amount of volatiles that are stripped from the wastewater will correlate to the saturation level in the mass of oxygen-containing gas or air that is exhausted from the reactor. In spite of the higher concentration of volatile organics in the gas phase, a key to the present invention is that the mass amount of volatile organics emitted from the reactor is lower, since the quantity or mass of exhaust from the reactor is substantially reduced by the refluxing operation whereby they become inert gases.

In the same way that vaporization of volatile organic compounds from the waste water is impeded by the gas pretreatment process, the vaporization of water from the wastewater is also retarded. This is due to the increased relative humidity of the recycled gas compared to the relative humidity of fresh air. By reintroducing a portion of the gas that is already at or near saturation, the ability of that gas to evaporate additional water is eliminated or significantly reduced.

The ratio of recycled gas to the total gas sparged into the system depends on the quantity of oxygen required by the biological process and the amount of gas that is required for agitation purposes. Ideally, the ratio should be in the range of 0.50 to 0.95 where the optimum lower value corresponds to cases of higher biological oxygen requirement or lower air agitation requirement. Conversely, the higher value corresponds to cases of lower biological oxygen requirement or higher air agitation requirement.

It is believed that operation of a biological process and use of the recycling process at elevated pressure will enhance the effect of the invention.

The following example is for illustrative purposes.

EXAMPLE A

The process was tested on the laboratory scale using a reactor vessel such as shown in FIG. 1, against an identical reactor without the gas pretreating feature, in order to demonstrate the improvement achieved by the present invention.

Two biological reactors were constructed of acrylic material to allow observation of the contents. The volume of each reactor was approximately four (4) liters. Each reactor was equipped with an air sparging system, liquid inlet, gas outlet, liquid outlet with a trap, and a cover. An equal amount of plastic rings or elements 30 were placed in each reactor to fill approximately 70% of the volume. Free space was allowed beneath the packing to allow for distribution of the air and liquid flows. Free space was allowed above the packing to allow disengagement of the gas from the liquid and for directing mixed preprocessed gas out of the reactor through the gas outlet.

A synthetic volatile containing wastewater was produced for use in both of the biological reactors. The composition of the wastewater was as follows:

| | |
|---|---|
| Benzene | 61 mg/l |
| Toluene | 52 mg/l |
| Xylene | 29 mg/l |
| Methyl Ethyl Ketone (MEK) | 93 mg/l |

The resultant mixture was tested for Biological Oxygen Demand (BOD) in accordance with the standard five day test and resulted in a BOD level of 95 mg/l.

The synthetic wastewater was fed to each of the biological reactors at a rate of 3 ml/min for each reactor.

The control reactor (without pretreated gas) was fed with 1,000 ml/min of fresh air through the sparging system. All of this air was vented at the gas outlet of the reactor. The reactor equipped with our gas precycling feature was fed with 100 ml/min of fresh air. 900 ml/min was collected from the gas outlet and cycled to the air sparger for a combined flow of 1,000 ml/min. The recycle rate of gas in this test was thus 90% of the amount of gas being fed to the reactor.

Analysis of the gas discharge from the reactors along with the calculated mass discharge of volatile organics is presented below:

| ANALYSIS OF VOLATILE ORGANIC COMPOUNDS IN GAS DISCHARGE | | | | |
|---|---|---|---|---|
| | Control Reactor | | Recycle Reactor | |
| Gas Discharge | | Mass Discharge | Gas Discharge | Mass Discharge |
| Benzene | 24 µg/l | 24 µg/min | 35 µg/l | 3.5 µg/min |
| Toluene | 6.2 µg/l | 6.2 µg/min | 10 µg/l | 1.0 µg/min |
| Xylene | 1.2 µg/l | 1.2 µg/min | 4.5 µg/l | 0.45 µg/min |
| MEK | ND | ND | ND | ND |

ND = none detected

Note that the concentration in µg/l is higher for the gas discharge from our reactor operation. The mass discharge of volatiles in µg/min however is dramatically lower in our reactor operation due to the lower mass discharge of gas from the apparatus with the use of previously pretreated oxygen containing gas such as air.

The reduction in volatile organic compounds in the reactor effluent is calculated by subtracting the mass value for the recycle reactor from the mass value of the control reactor and dividing the difference by the value of the control reactor using the data above. The important reduction in volatile organic discharge in the gas exhaust from the reactor using the present process is shown below for each component:

| REDUCTION IN VOLATILE ORGANIC COMPOUNDS IN REACTOR EXHAUST | |
|---|---|
| Benzene | 85% |
| Toluene | 84% |
| Xylene | 63% |
| MEK | ND |

The concentrations of the volatile compounds that remained in the liquid phase were also analyzed. These concentrations were used with the flow rate to calculate the mass discharges as well. The analysis and mass discharges are presented below:

| ANALYSIS OF VOLATILE ORGANIC COMPOUNDS IN LIQUID DISCHARGE | | | | |
|---|---|---|---|---|
| | Control Reactor | | Recycle Reactor | |
| | Liquid Discharge | Mass Discharge | Liquid Discharge | Mass Discharge |
| Benzene | 220 µg/l | 0.66 µg/min | 260 µg/l | 0.78 µg/min |
| Toluene | 65 µg/l | 0.20 µg/min | 85 µg/l | 0.26 µg/min |
| Xylene | 18 µg/l | 0.054 µg/min | 58 µg/l | 0.17 µg/min |
| MEK | 24 µg/l | 0.072 µg/min | 63 µg/l | 0.19 µg/min |

By preventing the escape of volatile organic compounds in the gas exhaust of our reactor operation and effecting their mixing and refluxing with the oxygen containing gas, the degree or amount of biological destruction of the compounds is enhanced. By performing a mass balance of the compounds in both the liquid phase and the gas phase, the overall destruction efficiency of the reactors can be calculated. The difference of the influent mass levels and effluent mass levels is divided by the influent level to calculate the destruction efficiency. Both the liquid and gas phase quantities were considered. The mass values listed in the above tables were used to make the following calculation.

| NET DESTRUCTION EFFICIENCY | | |
|---|---|---|
| | Control Reactor | Our Reactor |
| Benzene | 91.3% | 97.7% |
| Toluene | 95.6% | 98.8% |
| Xylene | 98.5% | 99.3% |
| MEK | 99.9% | 99.9% |

The above data demonstrates the dramatic improvement that results from the use of the invention in enhancing the biological treatment efficiency. It is well known that benzene has a higher potential to be stripped into the air than compounds such as MEK that have a greater affinity for water. The data shows that the difference in net destruction efficiencies was more pronounced with compounds that are more susceptible to being stripped from solution.

An unexpected result was also observed in the biological reactors that is believed to be related to the invention. In the reactor using the gas- preconditioning feature, substantial biological growth was observed in the portion of the reactor below the packing material in the vicinity of the sparger. It is believed that such growth is promoted by the presence of the volatile organic compounds in the gas being sparged into that reactor. The control reactor showed no such growth in that zone of the reactor apparatus.

As an optimum in our operative process, a rate of oxygen-containing gas of about 0.3 to 2.5 standard cubic feet per minute (SCFM) per square foot of horizontal cross section of the vessel may be introduced through the sparger or distributor 17. Also, a ratio of return gas of about 0.50 to 0.95 times the amount of oxygen gas or atmospheric air first introduced into the reactor for preconditioning, was found to be an optimum, as was the introduction of the preconditioned and the make-up gas in an amount of 0.3 to 2.5 cubic feet per minute per square foot of the horizontal cross-section of a cylindrical vessel, and the maintenance of a pressure of about 1.5 pounds of atmospheric pressure in the upper space D of the vessel 10.

It will be noted that waste water is very likely to contain both volatile and non-volatile organics. The rings 30 of FIG. 4 that are shown randomly packed in FIG. 1 may be molded from a suitable plastic material, such as polypropylene. They desirably provide high surface area for growth of bacterial cultures that, with other suspended cultures in the mixed liquor, digest organic contaminants in the waste water. As required, ammonia-nitrogen and phosphorous nutrients may be added to optimize growth and performance of the microorganisms. A system pH of about 6.5 to 7.5 has been found to be suitable for microbial growth.

In carrying out our invention from the standpoint of minimum volatile emissions, maximum contaminant degradation, maximum heat conservation, and minimum cost of operation we have determined that the optimum and improved results can be obtained using a preconditioned or preused gas having a combination of oxygen and inert gas wherein the mixture of preused gas and make up of oxygen containing gas has an oxygen content slightly over the amount required for satisfying the respiration requirements of the microbial population of the reactor.

The presence of inert gas such as nitrogen is required to provide sufficient volume to the gas being introduced to the reactor and to satisfy the requirements for agitation and scouring of the packing material. In order to achieve the combined effects of oxygenation, agitation, and scouring, the gas is introduced to the reactor at relatively low pressure through a manifold system through relatively large orifices to produce large or coarse bubbles of gas. The use of fine bubble diffusers such as are used to maximize the contact of the oxygen containing gas with the reactor contents does not provide for the scouring and agitation effect that are found with coarse bubbles. The orifice size for production of such coarse bubbles from low pressure gas was found to be in the range of about ⅛ inch to ⅜ inch. The manifold system is designed to distribute the gas bubbles substantially evenly across the horizontal plane of the reactor to achieve the desired effect.

The use of air with an initial concentration of approximately 21% oxygen and 78% nitrogen by volume has been found to be an inexpensive and practical source of oxygen and inert gas. The gas which is introduced to the reactor from the manifold system which is a mixture of makeup air (of about 21% $O_2$) and the thru-put gas contains significantly less oxygen than the make up air. The use of coarse bubbles of low oxygen content gas for oxygenation of the reactor contents could be expected to be detrimental to oxygen transfer efficiency. This potential deficiency is overcome by the use of a large volume of gas compared to the oxygen uptake rate. Gas introduction rates in the range of about 0.3 to 2.5 cubic feet per minute per square foot of reactor area have been found to be adequate for our oxygen uptake requirements.

A submerged fixed film biological process, such as herein involved, is a process that utilizes microorganisms that become attached to submerged surfaces in the biological reactor as the primary means for treating an organic containing wastewater. The attached biota form a film of biologically active material on such a surface. Typically, a packing material is used to increase the amount of surface area available for supporting biological growth in relation to the volume of the biological reactor. Such packing may be in a random form such as plastic rings dumped into the reactor, or in a structured form such as cross flow media which is stacked orderly into the reactor. In a submerged fixed film process, the packing material is submerged under the liquid level of the biological reactor with oxygen supplied to the biological film by aeration of the liquid contents of the reactor.

In the system shown in FIG. 1 randomly packed rings 30, such as of polypropylene resin material, provide relatively high surface areas for growth of bacterial cultures which, with other suspended cultures in the mixed liquor, digest organic contaminants in the waste water. A conventional structured packing 12, see FIG. 2, may be used in our system; it is also carried in a supported relation above the sparger chamber A by a perforated support grid 23.

What is claimed is:

1. A submerged biological process for aerobic treatment of waste water within a single closed vessel to, after one preliminary throughput therethrough, in subsequent waster water through-puts therethrough, maximize a reduction in atmospheric emission of biodegradable volatile organic compounds contained in the waste water wherein the vessel has an enclosed bottom sparging chamber surmounted by an upper cross-extending grid whose upper reaches define the bottom of an enclosed intermediate chamber containing microorganism-coated packing material, the intermediate chamber is in turn surmounted by an enclosed upper chamber having a lower level open to the intermediate chamber for in its lower reaches receiving, collecting and discharging treated waste water therefrom and having an upper level for receiving volatile organics released from the waste water and also for receiving an inert and oxygen containing treating gas mixture that has been introduced along with the waste water into the sparging chamber which comprises, initially introducing an oxygen and inert gas mixture into the bottom sparging chamber through course bubble distributor while simultaneously introducing contaminated waste water into the same chamber and thoroughly mixing the gas mixture and waste water therein while forming bubbles in the waste water, moving the mixture of gas and waste water upwardly through the grid into the intermediate chamber and through the packing material therein while subjecting said gas and water mixture to biological treatment therein, moving said gas and water mixture as well as biodegradable organic gas released from the waste water upwardly from the intermediate chamber into the upper chamber while separating said gases from the waste water, and taking a portion of a mixture of the now processed oxygen containing gas and released biodegradable organic gas from the upper chamber and introducing them with a make-up amount of oxygen-containing gas into the sparging chamber and repeating the previously defined treating and upward movement of the waste water within the chambers, and discharging a remaining portion of the final gas mixture from the upper chamber, all in such a manner as to effectively reduce and minimize the volatile organic gas content of the treated waste water as well as degrade the amount of volatile organic gas in the oxygen and inert gas mixture that is collected in and then discharged from the upper chamber.

2. A process as defined in claim 1 wherein the oxygen-containing gas introduced and employed is air and the inert gas is nitrogen and/or carbon dioxide.

3. A process as defined in claim 1 wherein the oxygen-containing gas has an oxygen content slightly over the amount required for satisfying the respiration requirements of a microbial population of the reactor.

4. A process as defined in claim 1 that is a submerged fixed film process in which packing material employed in the intermediate chamber is submerged under the liquid level therein, and the treated waste water defines the upper reaches of the intermediate chamber and the lower reaches of the upper chamber of the closed vessel.

5. A process as defined in claim 1 wherein a maximized biological growth in the waste water is effected, a gas pressure is maintained in the vessel of less than about 1.5 atmospheric gauge as measured adjacent a top cover portion thereof, and the gas being introduced into the vessel has an up-take rate of about 0.03 to 2.5 feet per minute per square foot of reaction area.

6. A process as defined in claim 1 wherein a quantity of air and inert gas mixture is introduced through a sparger into the bottom chamber in excess of that required to satisfy biological requirements of the operation.

7. A process as defined in claim 1 wherein packing material within the intermediate chamber is made up of rounded elements of resin material in a random dump relation therein.

8. A process as defined in claim 1 wherein the packing material is substantially fully submerged under the level of the waste water being processed therethrough and into the upper chamber.

9. A process as defined in claim 1 wherein a pressure is maintained in the vessel of less than about 1.5 atmospheric gauge as measured within the uppermost chamber above a level of the treated waste water therein.

10. A process as defined in claim 1 which is a fixed film process wherein the packing material is fully submerged within the waste water in the intermediate chamber, the gas mixture introduced into the bottom compartment after startup from the upper compartment of the vessel is in a ratio of about 0.50 to 0.95 of the amount of the inert and oxygen containing gas mixture first introduced in starting the operation.

11. A process as defined in claim 10 wherein the gas being introduced into the vessel has an up-take rate of about 0.03 to 2.5 cubic feet per minute per square foot of reaction area therein.

12. A closed system fixed film continuous process for aerobic treatment of a liquid in the nature of waste water in which its volatile organic compound content is greatly reduced within a closed vertically compartmentalized and upwardly extending vessel having a lower sparging chamber into which a pretreated gas mixture of oxygen and an inert gas and volatile organics previously released from contaminated waste water being treated are simultaneously introduced, applying the pretreated gas mixture with a make-up oxygen and an inert gas mixture in a sparging relation into the lower chamber and continuously subjecting the waste water to gas mixing scouring agitation while forming relatively large and coarse gas bubbles therein, moving the gas-mixed waste water upwardly through a cross-extending support into an intermediate upper chamber of the vessel containing microorganism-coated packing elements and subjecting the gas-mixed waste water to biological reaction treatment therein while maximizing the quantity of volatile organic compounds that are degraded and released from the waste water by the biological treatment, then moving the treated waste water upwardly into an enclosed free space containing uppermost chamber of the vessel and therein collecting the treated waste water at a lower level therein and the gas in an upper level therein, collecting and mixing oxygen-containing gas as well as biodegradable volatile organics released from the treated waste water into and within upper reaches of the upper chamber, removing the treated waste water from the upper chamber, and taking at least a portion of the now saturated oxygen and inert gas and degraded and released volatile organics containing gas mixture from the upper chamber and introducing them into the lower chamber with a supplemental amount of oxygen-containing gas and repeating the defined process.

13. A process as defined in claim 12 wherein the oxygen-containing gas is humidified during its upward movement within the vessel into the upper chamber and is in a humidified condition when reintroduced into the lower chamber.

14. A process as defined in claim 13 wherein the packing is made up of rounded elements of resin construction in a random dump relation within the intermediate chamber.

15. A process as defined in claim 12 wherein bio tower random dump packing elements are employed in the intermediate chamber.

* * * * *